United States Patent [19]
Wallace

[11] 3,799,405
[45] Mar. 26, 1974

[54] DISCHARGE ROLLERS FOR A HOPPER BOTTOM

[75] Inventor: Joseph E. Wallace, Creston, Iowa

[73] Assignee: Vanmark Corporation, Creston, Iowa

[22] Filed: Aug. 12, 1971

[21] Appl. No.: 171,054

[52] U.S. Cl............... 222/238, 198/213, 222/271
[51] Int. Cl. ...................... B65g 33/08, G01f 11/00
[58] Field of Search .......... 222/271, 272, 238, 413; 209/107, 101, 106; 198/64, 103, 213; 15/3.11, 3.17; 221/237

[56] References Cited
UNITED STATES PATENTS

| | | | |
|---|---|---|---|
| 3,283,895 | 11/1966 | Rollins | 198/213 X |
| 2,997,086 | 8/1961 | Armer | 15/3.11 X |
| 2,786,574 | 3/1957 | Clark | 209/107 |
| 1,928,339 | 9/1933 | Mulvany | 198/213 UX |
| 2,042,896 | 6/1936 | Hofler et al. | 222/238 |
| 3,422,987 | 1/1969 | Crabb | 221/237 X |

Primary Examiner—Robert B. Reeves
Attorney, Agent, or Firm—Henderson & Strom

[57] ABSTRACT

A hopper for receiving, conveying and discharging material such as whole vegetables in which the material is conveyed by a pair of rotating discharge rollers having helical projections about their outer surfaces. The discharge rollers have a double winding of the helical projections at the receiving end, and a third winding at the discharge end to facilitate smooth discharge. Pinch-preventing means are provided to prevent material from being pinched between the discharge rollers, and may comprise a stationary bar or baffle, or may include secondary rollers with or without a baffle.

2 Claims, 9 Drawing Figures

DISCHARGE ROLLERS FOR A HOPPER BOTTOM

BACKGROUND OF THE INVENTION

In the handling and processing of materials it is frequently desirable to have a device for receiving the material from storage and discharging the received material at a selected uniform rate. Such devices enable processing equipment to be operated continuously at peak efficiency by supplying a steady flow of material at a selected pace. Many types of devices of this sort, often referred to as hoppers, are available for handling practically any type of solid material.

One successful hopper which has been available for some time includes a receiving section, a metal mesh conveyor belt or chain for moving received material, a controllable drive means, and an adjustable outlet opening, all of which go to provide a generally satisfactory hopper. However, this type hopper has some drawbacks, such as an excessive number of roller bearings required for the mesh conveyor, a rather short life between replacement of conveyor means, and an unsatisfactory level of product damage, particularly when handling material such as whole vegetables.

A machine is described in U.S. Pat. No. 1,832,035 which utilizes parallel rollers with helical projections wound about the outer surfaces to convey material through a sorting or grading machine in which different sizes of product can be isolated.

Many other hoppers of various types are available, each having specific advantages and disadvantages.

SUMMARY OF THE INVENTION

This invention relates to a device for receiving, conveying and discharging material, and more particularly to a hopper having an inlet end and a conveyor means including a pair of discharge rollers having helical projections on their outer surfaces for conveying material from the inlet section of the hopper through the discharge thereof at a selected uniform rate.

In accordance with the present invention, a pair of discharge rollers are provided with a first helical winding or projection about their outer surfaces, and along substantially the entire length thereof. A second helical winding or projection, preferably of the same pitch as the first winding, is provided for a fraction of the length of the discharge rollers on the section adjacent the inlet of the hopper. The purpose of this second winding is to provide additional driving force (as distinguished from speed) for the inlet section to assure that the material as it is received will be moved out from the inlet section. This double wound section pushes the material toward the discharge end with sufficient force to keep a load built up at the discharge end to facilitate a uniform output.

To further facilitate a uniform output, a third winding is provided on the discharge end of the rollers to provide an auxilliary winding or "kicker." Without this third winding, the output tends to surge with each revolution of the rollers. This auxilliary winding need only extend for a part of one revolution about the roller, and is spaced so as to be about 180° out of phase with the primary winding.

Generally, the discharge rollers are mounted in a side-by-side, parallel relationship and rotate such that their upper surfaces move toward each other. This leads to a problem, particularly when handling soft material, of causing pinch points along the line of closest proximity of the rollers. This invention provides unique solutions to this pinching problem.

According to one aspect of this invention, a rigid bar is provided above the pinch line to prevent material from contacting the discharge rollers at their line of proximity. According to another aspect of the invention, a baffle or other rigid means is provided which overlies the adjacent halves of the discharge rollers, or extends outward slightly beyond the vertical centers of the discharge rollers, so that gravity acting on the material being conveyed by the discharge rollers acts to lessen the tendency of the rollers to pinch the product. According to still another aspect of the invention, a secondary roller is provided in association with each dischage roller to alleviate the tendency of the material to be pinched, in a manner to be defined more particularly below.

A hopper in accordance with this invention is relatively maintenance free as compared to belt types, is not subject to wear in the manner that belt conveyors are, and has a reduced number of parts compared to other hoppers.

It is an object of this invention to provide an improved hopper which receives, conveys and discharges material effectively and uniformly, with a minimum amount of damage to the material being handled.

DESCRIPTION OF THE PREFERRED EMBODIMENTS

Figure 1:
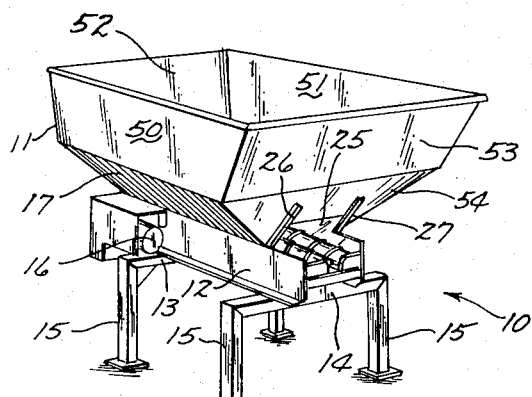
FIG. 1 is a perspective view illustrating the device of the invention.

A hopper 10 in accordance with this invention is shown in perspective view in FIG. 1. The hopper 10 has an upper material holding section 11 mounted on a frame 12 which in turn is supported by braces 13 and 14 supported by vertical legs 15. A drive motor 16, which can be any of several conventional types, such as a variable speed electric motor or a motor and gear combination, or any other suitable drive mechanism, is provided for powering the discharge rollers.

Figure 5:
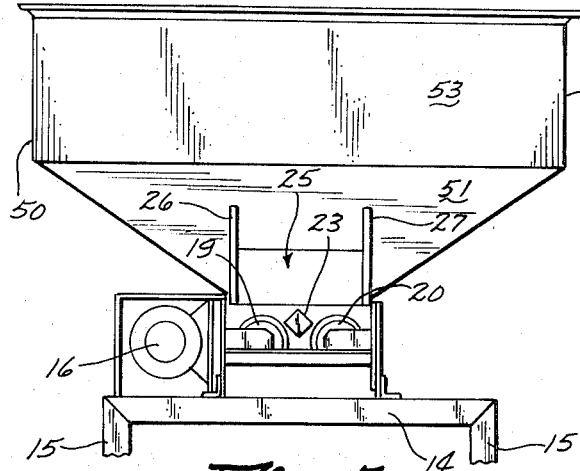
FIG. 5 is an end view showing the discharge end of a hopper in accordance with the invention.

The material holding section includes vertical upper sidewalls 50 and 51, upper wall 52 on the receiving end, and upper wall 53 on the discharge end. The upper section 11 also includes lower side walls 17 and 18 which slope inwardly from the upper section 11 to the frame 12, as best seen in FIGS. 3 and 5.

Figure 2:
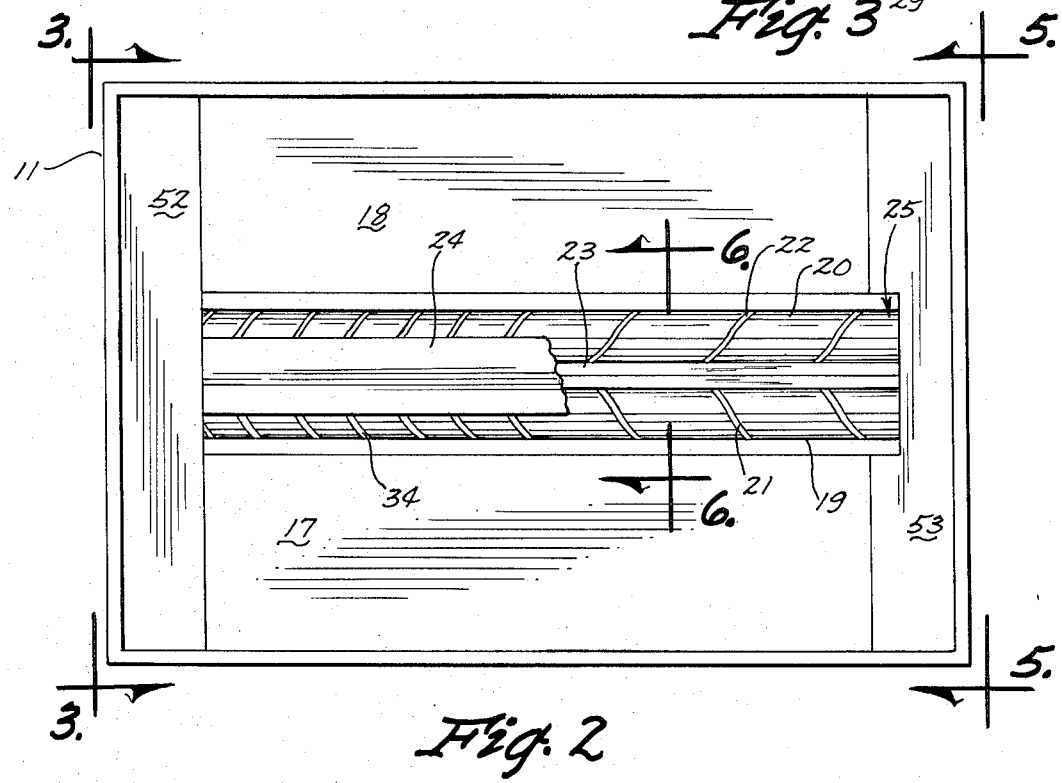
FIG. 2 is a top plan view, partially broken away.
Figure 6:
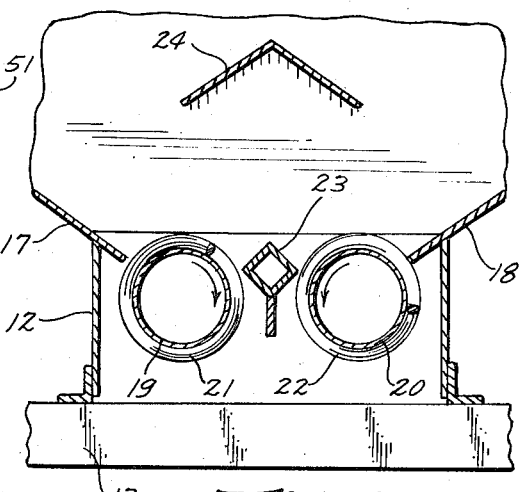
FIG. 6 is a fragmentary cross sectional view taken along the line 6—6 of FIG. 2 illustrating one embodiment of the invention.

The hopper 10 has a pair of rotatable discharge rollers 19 and 20 mounted in side-by-side relation as best seen in FIG. 2. The discharge rollers 19 and 20 have helical windings 21 and 22 along substantially their entire length. A pinch-preventing means, shown as a bar 23 mounted just above the line of closest proximity of discharge rollers 19 and 20, is best illustrated in FIGS. 2 and 3. The windings 21 and 22 are oppositely wound, that is, one of the discharge rollers has windings with a right hand configuration and the other discharge roller has windings with a left hand configuration. This results in a forward movement of material within the hopper when the discharge rollers are rotated such that the upper surfaces travel toward each other in the case illustrated in FIG. 2. A baffle 24 (FIGS. 2 and 6) extends parallel to the discharge rollers above the pinch-preventing means. This baffle 24 helps prevent heavy load forces over the pinch-preventing means 23. The upper section 11 of the hopper includes a discharge opening 25 at one end thereof. This discharge opening is illustrated in FIGS. 1 and 5 as being a rectangular opening 25 in wall 54 at the lower discharge end of 11, bounded on each side by channels 26 and 27 in which a sliding gate (not shown) can be adjustably positioned to control the discharge from the hopper.

Figure 3:
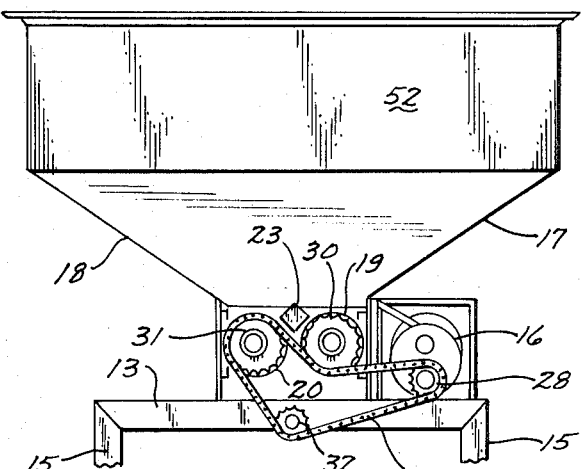
FIG. 3 is an end view illustrating the drive means for rotating the discharge rollers.

The means for rotating the discharge rollers is illustrated in FIG. 3. The drive motor 16 turns a sprocket 28, which drives a chain 29 passing over driven sprockets 30 and 31, which are connected to the discharge rollers 19 and 20 respectively. An idler sprocket 32 is supported by brace 13. The chain is threaded in a manner that will cause the discharge rollers 19 and 20 to be rotated in opposite directions. In most cases, the direction of rotation will be such that the upper surfaces of the discharge rollers 19 and 20 are rotating toward one another, but in certain instances, as will be described in detail below, the discharge rollers may be rotated oppositely of this arrangement. It is understood that other suitable driving mechanisms could be utilized to perform this same function, and the invention is not limited to the chain and sprocket arrangement. Rotation of the discharge rollers 19 and 20 such that the upper surfaces turn toward one another will cause meterial in the upper section 11 to be driven from the receiving end toward the discharge opening 25.

Figure 4:
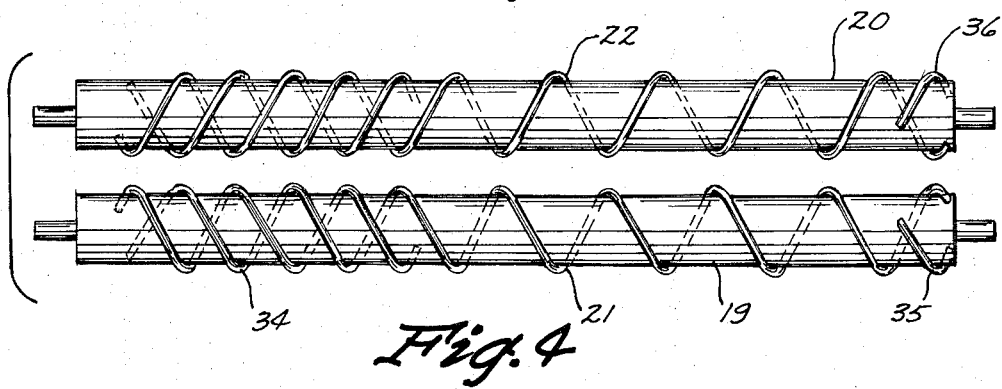
FIG. 4 is a top plan view of a pair of discharge rollers, illustrating the details of the helical windings thereon.

The preferred arrangement of discharge rollers 19 and 20 is illustrated in detail in FIG. 4, which shows the manner in which the helical windings are applied thereto. The rollers 19 and 20 are preferably identical in size and shape and also in the windings along their lengths, although as can be seen in FIG. 4 the direction of rotation of the helical windings is opposite for the two rollers. That is, roller 19 has right hand spiraled windings thereon, and roller 20 has left hand spirals thereon. Roller 19 includes a winding 21 which extends substantially the entire length of the roller. A second winding 34, which is identical in pitch to the primary winding 21 and preferably 180° out of phase therewith, extends along a substantial length of the roller 19 beginning at the receiving end, which is the left hand end of roller 19 as shown in FIG. 4. Similar, but oppositely spiraled, windings are applied to the roller 20. The windings may be of any suitable construction, and preferably are formed of metal rods welded or otherwise applied to the rollers in a helical configuration. One half inch metal rods are suitable for most applications. Also illustrated in FIG. 4 are winding segments 35 and 36 which are applied to the roller surfaces near the right hand or discharge end thereof. These third windings, which only extend for a fraction of a revolution, help to maintain a smooth discharge rate. Without the windings 35 and 36, the discharge from the hopper tends to surge each time the discharge rollers make a revolution. By using the windings 35 and 36, a more uniform and smoother delivery of product is obtained.

FIG. 5 illustrates the discharge end of the apparatus of this invention. The opening 25, which may be adjusted by positioning a sliding gate (not shown) on the channels 26 and 27 on each side of the opening, is formed in wall section 54. The discharge rollers 19 and 20 are rotated by the drive means such that the upper surfaces of the discharge rollers move toward one another. The pinch-preventing bar 23 keeps material from being pinched between the rollers 19 and 20. The baffle plate 24 (FIGS. 6-9) causes material being loaded into the hopper to be diverted to the sides thereof to prevent excess loading over the area between the discharge rollers.

The embodiment of the invention which has been described thus far, and which includes a square bar 23 mounted above the line of nearest proximity of the discharge rollers and close to the windings thereon (FIG. 6), is the most preferred arrangement for many purposes. This arrangement gives a high capacity with a minimum of complexity.

There are instances, however, particularly when handling especially soft or easily damaged material, when other configurations and types of pinch-preventing means are preferred. These alternate types of pinch-preventing means are illustrated in FIGS. 7-9.

Figure 7:
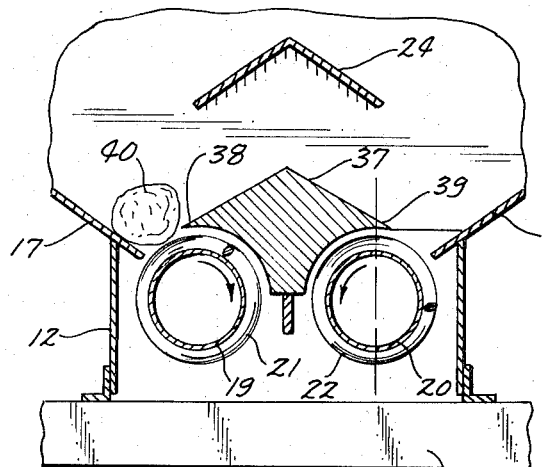
FIG. 7 is a fragmentary cross sectional view of the interior of a hopper in accordance with another embodiment of the invention.

In FIG. 7, the pinch-preventing means includes a member 37 which overlies the entire inner halves of the upper surfaces of discharge rollers 19 and 20. The member 37 includes extremities 38 and 39 which extend slightly beyond the planes above the center lines of rollers 19 and 20. This arrangement insures that material being conveyed through the hopper, illustrated as a potato 40 in FIG. 7, will tend to fall away from the pinch point due to gravity when the rollers operate as shown in FIG. 7. However, the throughput capacity for this arrangement, as would be predicted, is considerably lower than for the arrangement of FIG. 6 due to the reduced amount of roller surface in contact with the material.

Figure 8:
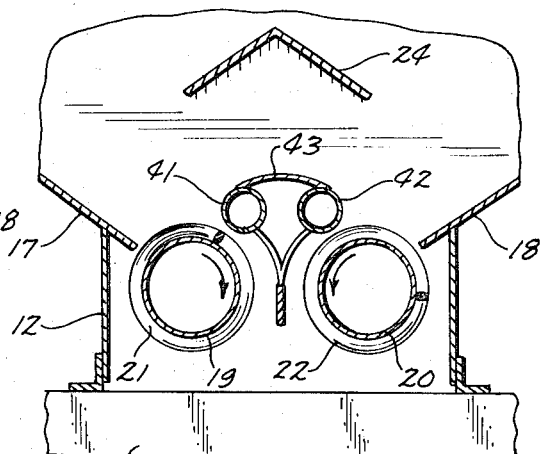
FIG. 8 is a fragmentary cross sectional view of still another embodiment of the invention utilizing secondary rollers in conjunction with the primary discharge rollers.

FIG. 8 illustrates another preferred embodiment wherein a secondary pair of rollers 41 and 42 extend parallel to the discharge rollers. Each secondary roller is rotated in the same direction as its associated discharge roller. That is, secondary roller 41 rotates in the same direction (clockwise) as discharge roller 19, the secondary roller 42 rotates counter clockwise as does discharge roller 20. The secondary rollers may conveniently be driven by the same mechanism that drives the discharge rollers by addition of appropriate sprockets. The speed of rotation of the secondary rollers may be selected by choice of sprocket size, for example. Since the secondary rollers 41 and 42 rotate toward each other, a plate 43 is provided to prevent a pinch point forming between them.

Figure 9:
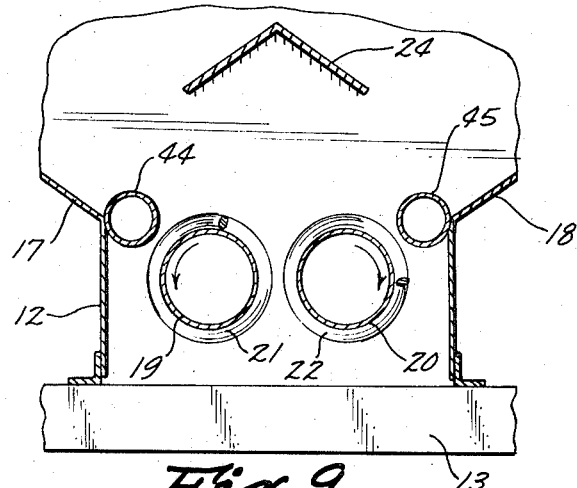
FIG. 9 is a fragmentary cross sectional view of still another embodiment of the invention utilizing secondary rollers in which the upper surfaces of the discharge rollers rotate away from each other.

Still another preferred embodiment of the pinch-preventing means is illustrated in FIG. 9. Secondary rollers 44 and 45 are arranged to rotate in the same direction as their associated discharge rollers, but the secondary rollers in this case are located near the side walls of the hopper and away from the center of the discharge. The discharge rollers in this embodiment rotate such that their upper surfaces move away from one another. This arrangement, which would require reversing the direction of spiral of the helical windings are compared to the other embodiments, does an excellent job of preventing pinching, but unfortunately sacrifices capacity as compared to the FIG. 6 embodiment. Nevertheless, for certain materials it may be the preferred arrangement.

It has been shown that an improved hopper in accordance with this invention includes a pair of discharge rollers having helical projections about their outer surfaces, and includes a choice of several particular pinch-preventing means. The use of the pair of discharge rollers reduces the number of moving parts required as compared to a belt type conveyor, and the discharge rollers have a long life and require little maintenance. The discharge rollers may be driven by any suitable means at speeds compatible with the particular material being handled. The unique arrangement of double winding on the inlet section of the discharge rollers provides for keeping the material moving away from the inlet and keeps the product built up at the discharge end to facilitate smooth discharge of product. The discharge is further enhanced by provision of an auxilliary or "kicker" winding at the discharge end of each roller.

The operation of a hopper in accordance with this invention will now be described. A material to be handled, such as whole vegetables, is fed into the inlet section of the hopper body. The baffle 24 prevents heavy loads from being concentrated over the center of the conveying means. The pair of discharge rollers 19 and 20 are rotated by a drive means such that material in the hopper will be driven by projecting helical windings on the discharge rollers toward the discharge opening 25 in the hopper. The double wound section of the rollers acts to keep material pushed up against the discharge end wall, and the "kicker" windings 35 and 36 provide for a uniform discharge of material from the hopper. The discharged material typically is conveyed to further processing of the type where a steady feed of material at a selected rate is desirable. The discharge rollers, and also the secondary pinch-preventing rollers in cases where they are utilized, are powered by any suitable drive means. As the material progresses toward the discharge end, it is prevented from pinching between the discharge rollers by one of several pinch-preventing means, thus reducing damage to the material.

While preferred embodiments of the invention have been described above including a plurality of pinch-preventing means, such description is by way of illustration, and not to be considered as limiting of the invention. It will be apparent that numerous modifications and variations could be made without departing from the true scope of the invention, which is to be defined by the appended claims.

I claim:

1. A hopper of the type adapted to receive and discharge materials such as whole vegetables including:

a pair of discharge rollers mounted in a side-by-side relationship near the bottom of the hopper, the upper surfaces of said discharge rollers being rotatable toward each other;

helical conveying means about the outer surfaces of the rollers and affixed thereto, the helical conveying means including, on each discharge roller, a first helical winding extending substantially the effective length of the roller, and a separate helical winding segment at the discharge end of each roller, the separate helical winding segment being spiraled in the same direction as the first winding;

means for rotating the discharge rollers;

pinch-preventing means including a secondary roller associated with each of the discharge rollers and located adjacent an upper surface thereof, the secondary rollers being rotatable in the same direction as their associated one of the pair of discharge rollers; and a baffle overlying the space just above the secondary rollers.

2. The hopper of claim 1 wherein the upper surfaces of said pair of discharge rollers rotate away from each other.

* * * * *